US005750044A

United States Patent [19]

Yoneyama et al.

[11] Patent Number: 5,750,044

[45] Date of Patent: May 12, 1998

[54] MAGNET AND BONDED MAGNET

[75] Inventors: Tetsuhito Yoneyama; Tomomi Yamamoto; Tetsuya Hidaka; Akira Fukuno, all of Chiba, Japan

[73] Assignee: TDK Corporation, Tokyo, Japan

[21] Appl. No.: 500,578

[22] Filed: Jul. 11, 1995

[30] Foreign Application Priority Data

| | | | |
|---|---|---|---|
| Jul. 12, 1994 | [JP] | Japan | 6-182776 |
| Mar. 10, 1995 | [JP] | Japan | 7-079431 |

[51] Int. Cl.$^6$ .......... C04B 35/04

[52] U.S. Cl. .......... 252/62.54; 148/301; 420/83; 420/128; 420/581

[58] Field of Search .......... 252/62.54, 62.55; 148/301, 303; 420/83, 128, 581

[56] References Cited

U.S. PATENT DOCUMENTS

| | | | |
|---|---|---|---|
| 5,022,939 | 6/1991 | Yajima et al. . | |
| 5,049,208 | 9/1991 | Yajima et al. . | |
| 5,186,766 | 2/1993 | Iriyama et al. | 148/301 |
| 5,209,789 | 5/1993 | Yoneyama et al. . | |
| 5,309,977 | 5/1994 | Yoneyama et al. . | |
| 5,480,495 | 1/1996 | Sakurada et al. | 148/301 |
| 5,549,766 | 8/1996 | Tsutai et al. | 148/301 |

FOREIGN PATENT DOCUMENTS

| | | | |
|---|---|---|---|
| 3 16102 | 1/1991 | Japan . | |
| 4-216601 | 8/1992 | Japan | 148/303 |
| 4-241402 | 8/1992 | Japan | 148/301 |
| 4-260302 | 9/1992 | Japan | 148/301 |
| 4-323802 | 11/1992 | Japan | 148/303 |
| 6 172936 | 6/1994 | Japan . | |
| 6 279915 | 10/1994 | Japan . | |
| 6 330252 | 11/1994 | Japan . | |
| 6 333715 | 12/1994 | Japan . | |
| 6 342706 | 12/1994 | Japan . | |
| 7 66021 | 3/1995 | Japan . | |

OTHER PUBLICATIONS

Journal of Magnetism and Magnetic Materials, vol. 124, pp. 1–4, 1993, J. Ding, et al., "Remanence Enhancement in Mechanically Alloyed Isotropic Sm7Fe93–Nitride".

Proceedings of the Eleventh International Workshop on Rare-Earth Magnets and Their Applications, vol. 2, pp. 35–60, Oct. 1990, J.M.D. Coey, et al. "A New Family of Rare Earth Iron Nitrides".

*Primary Examiner*—John Sheehan

*Attorney, Agent, or Firm*—Oblan, Spivak, McClelland, Maier & Neustadt, P.C.

[57] ABSTRACT

A magnet consists essentially of 4–8 at % of R, 10–20 at % of N, 2–10 at % of M, and the balance of T wherein R is at least one rare earth element, Sm being present in R in a proportion of at least 50 at %, T is Fe or Fe and Co, M is Zr with or without partial replacement by at least one element of Ti, V, Cr, Nb, Hf, Ta, Mo, W, Al, C, and P. Contained in the magnet are a hard magnetic phase based on R, T, and N and containing at least one crystalline phase selected from $TbCu_7$, $Th_2Zn_{17}$, and $Th_2Ni_{17}$ types and a soft magnetic phase consisting of a T phase having a bcc structure, the soft magnetic phase having a mean grain size of 5–60 nm and being present in a proportion of 10–60% by volume. This construction ensures high coercivity, high squareness ratio, and high maximum energy product.

10 Claims, 3 Drawing Sheets

50 nm

MAGNET AND BONDED MAGNET

BACKGROUND OF THE INVENTION

1. Field of the Invention

This invention relates to rare earth nitride magnets and bonded magnets.

2. Prior Art

Among high performance rare earth magnets, Sm-Co magnets and Nd-Fe-B magnets have been used in practice. Over these years, active research works have been made for the development of novel rare earth magnets.

For example, there was proposed a rare earth nitride magnet of a Sm-Fe-N system wherein nitrogen forms an interstitial solid solution with $Sm_2Fe_{17}$ crystal grains. It was reported that basic physical properties including $4\pi Is=15.4$ kG, Tc=470° C., and $H_A$=14T are available at a composition near $Sm_2Fe_{17}N_{2.3}$, a metal bonded magnet using Zn binder provides a (BH)max of 10.5 MGOe, and introduction of nitrogen into a $Sm_2Fe_{17}$ intermetallic compound substantially increases the Curie temperature to improve heat stability. See Paper No. S1.3 at the Sixth International Symposium on Magnetic Anisotropy and Coercivity in Rare Earth-Transition Metal Alloys, Pittsburgh, Pa., Oct. 25, 1990 (Proceedings Book: Carnegie Mellon University, Mellon Institute, Pittsburgh, Pa. 15213, USA).

The bonded magnet of the above report uses magnet particles having a particle size of the order to constitute substantially single crystal particles and its coercivity generating mechanism is of nucleation type. Therefore, its magnetic properties are readily affected by the surface state of particles. More particularly, while mechanical impact during pulverization and oxidation of particles cause defects at the surface of magnet particles, which defects create magnetic walls, nucleation type magnets allow for easy migration of magnetic walls because of the absence of pinning sites for magnetic walls within crystal grains, and thus tend to lose their coercivity.

For improvements of rare earth nitride magnets, Japanese Patent Application Kokai (JP-A) No. 16102/1991 proposes a Re-Fe-N-H-M system magnet of two phase separation type wherein Re is a rare earth element and M is at least one of elements such as Li, Na, K, Mg, Ca, Sr, Ba, Ti, Zr, Hf, V, Nb, Ta, Cr, Mo, W, Mn, Pd, Cu, Ag, Zn, B, Al, Ga, In, C, Si, Ge, Sn, Pb and Bi and oxides, fluorides, carbides, nitrides, hydrides, carbonates, sulfates, silicates, chlorides and nitrates of these elements and rare earth elements. It is intended in this publication that addition of M creates a microscopic structure of the two phase separation type as found in Sm-Co systems or Nd-Fe-B systems so that high magnetic properties as available in powder form may be produced even in the form of bulk magnets like sintered magnets or bonded magnets. More illustratively, a bulk magnet of the two phase separation type having a M-rich phase at grain boundaries and a M-poor or M-free phase at the grain center is produced. According to the publication, a sintered magnet or bonded magnet is prepared by forming a master alloy by a melting or liquid quenching technique, followed by crushing, treatment with hydrogen nitride, and fine pulverization. It is stated that the addition of M immediately before fine pulverization is especially effective.

Although the above-cited publication mainly refers to sintered magnets, it is also described that the same applies to bonded magnets. In Example of the publication, a bonded magnet is prepared by adding 8 mol % of Zn to an alloy powder of $Sm_{8.9}Fe_{75.4}N_{15.5}H_{0.2}$ (particle size 20 to 38 μm), milling the powder in a rotary ball mill, annealing at 430° C. for 1.5 hours to form a fine powder of the composition: $SM_{8.2}Fe_{69.5}N_{14.3}H_{0.05}Zn_{8.0}$, and press molding the fine powder into a compact. Since the publication uses such a fine powder for the preparation of a bonded magnet, it is difficult to provide magnet properties consistently due to the influence of oxidation as well as to increase the magnet density. Since the proportion of Sm and Fe is approximately equal to the stoichiometric composition: $Sm_2Fe_{17}$ (10.5 at % Sm), a relatively large amount of Sm used precludes cost reduction.

In order to produce Sm-Fe-N system magnets at low cost, it is effective to reduce the content of expensive rare earth elements. When the rare earth element content is reduced and especially when Sm/(Sm+Fe) is reduced to 10 at % or less, more α-Fe phase precipitates to substantially lower coercivity so that magnet stability becomes insufficient.

Reported in J. Magn. Magn. Mater., 124 (1993), 1–4 is a magnet which is obtained by nitriding a Sm-Fe alloy prepared by mechanical alloying and having a rare earth element content as low as 7 at %. This magnet consists of a $Sm_2Fe_{17}N_x$ phase and an α-Fe phase and exhibits a coercive force as low as about 3.9 koe. Since the mechanical alloying is likely to induce oxidation, it is not recommended as an industrial technique of handling oxidation susceptible metals such as rare earth elements.

DISCLOSURE OF THE INVENTION

An object of the present invention is to provide an inexpensive magnet having high coercivity, high squareness ratio and high maximum energy product.

This and other objects are achieved by the present invention which is defined below as (1) to (10).

(1) A magnet consisting essentially of 4 to 8 at % of R, 10 to 20 at % of N, 2 to 10 at % of M, and the balance of T wherein R is at least one rare earth element, Sm being present in R in a proportion of at least 50 at %, T is Fe or Fe and Co, M is Zr with or without partial replacement by at least one element selected from the group consisting of Ti, V, Cr, Nb, Hf, Ta, Ho, W, Al, C, and P, said magnet comprising a hard magnetic phase based on R, T, and N and containing at least one crystalline phase selected from the group consisting of $TbCu_7$, $Th_2Zn_{17}$, and $Th_2Ni_{17}$ types and a soft magnetic phase consisting of a T phase having a bcc structure, said soft magnetic phase having a mean grain size of 5 to 60 nm and being present in a proportion of 10 to 60% by volume.

(2) The magnet of (1) having a squareness ratio Hk/iHc of at least 15%.

(3) The magnet of (1) which is prepared by forming a quenched alloy by a liquid quenching technique and subjecting it to nitriding treatment.

(4) The magnet of (3) wherein the liquid quenching technique includes setting the surface speed of a chill base relative to a molten alloy to at least 45 m/s.

(5) The magnet of (3) which is prepared by heat treating the quenched alloy for controlling its textural structure prior to the nitriding treatment.

(6) The magnet of (5) which is prepared by subjecting the quenched alloy to heat treatment for controlling its textural structure in a hydrogen-containing atmosphere, causing hydrogen to release from within the quenched alloy for precipitating at least one crystalline phase selected from the group consisting of $TbCu_7$, $Th_2Zn_{17}$, and $Th_2Ni_{17}$ types and a T phase of bcc structure, and thereafter effecting the nitriding treatment.

(7) The magnet of (6) wherein the quenched alloy has a crystalline phase of $TbCu_7$ type prior to the heat treatment for controlling its textural structure.

(8) The magnet of (5) wherein the quenched alloy prior to the heat treatment for controlling its textural structure, as analyzed by X-ray diffractometry, has an $I_S/I_H$ value of up to 0.4 wherein $I_H$ is the intensity of a maximum peak of the $TbCu_7$ type crystalline phase and $I_S$ is the intensity of a maximum peak of the soft magnetic phase.

(9) The magnet of (1) wherein Sm is present in R in a proportion of at least 80 at %, and the hard magnetic phase contains a crystalline phase of $TbCu_7$ type which exhibits a maximum peak in the range $2\theta=42.00°$ to 42.5° on analysis by X-ray diffractometry.

(10) A bonded magnet comprising a powder of the magnet of (1) and a binder.

FUNCTION AND BENEFIT

Although prior art Sm-Fe-N system magnets fail to provide high coercivity at a low content of rare earth element due to precipitation of more α-Fe phase, the magnet of the present invention is designed to provide a high coercivity and high squareness ratio and hence, an improved maximum energy product by reducing the content of R based on Sm, adding a specific amount of element M, and limiting the N content to the specific range of 10 to 20 at %, thereby developing the above-mentioned fine textural structure. By the term squareness ratio used herein is meant Hk/iHc. It is noted that iHc is coercivity and Hk is the strength of an external magnetic field at which the magnetic flux density is 90% of the residual magnetic flux density or remanence in the second quadrant of a magnetic hysteresis curve. With low Hk, a high maximum energy product is never available. Hk/iHc is regarded as an index of magnet performance and represents a degree of squareness in the second quadrant of a magnetic hysteresis curve. For an identical iHc, larger Hk/iHc leads to a magnet which has a sharp distribution of microscopic coercivity, is easy to magnetize, is minimized in variation of magnetization, and has a higher maximum energy product. The magnet on use is thus more stable in magnetization with respect to an external demagnetizing field or a self-demagnetizing field so that a magnetic circuit involving the magnet is more stable in performance. In the magnets of the invention, a Hk/iHc of at least 15% is readily available, especially at least 18% and even at least 20% being possible. It is noted that the Hk/iHc is usually up to about 45%. A Hk of at least 1 kOe is readily available, especially at least 1.5 koe and even at least 2 kOe being possible. It is noted that the Hk is usually up to about 4 kOe. In the event of a bonded magnet, a Hk/iHc as high as about 20 to 50% is available.

Therefore, the present invention provides a high performance magnet at low cost because a high coercivity, high squareness ratio and high maximum energy products are available while reducing the amount of expensive R used.

The above-referred J. Magn. Magn. Mater., 124 (1993), 1–4 describes that the α-Fe phase as annealed has a grain size of 20 to 55 nm. The magnet described in this article is free of an element M as used in the present invention and the α-Fe phase is formed by mechanical alloying. It is believed that for this reason, high coercivity is not available despite the reduced grain size of α-Fe phase.

Also the above-referred JP-A 16102/1991 includes exemplary magnets using an element M as used in the present invention although all they are sintered magnets and have a different textural structure than the present invention. Since the proportion of rare earth element is approximately equal to the stoichiometric composition, cost reduction is difficult.

The Electrical Society Research Meeting Paper MAG-93, 244–253 includes a report about "The magnetic properties of Sm-Fe-Co-V system nitrided compounds and bonded magnets thereof." This bonded magnet is manufactured by the following steps. First an alloy of $Sm_2(Fe_{0.9}Co_{0.1})_{17-x}V_x$ wherein x=0 to 2.0 is cast from a melt, subject to solid solution treatment, and crushed to about 30 μm by a jaw crusher. After nitriding treatment, it is milled to about 3 to 5 μm by a jet mill. It is then mixed with an epoxy resin binder and compacted in a magnetic field into a bonded magnet.

According to this report, the alloy takes a crystal structure of $Th_2Zn_{17}$ type with x=0 to 1.0 and a crystal structure of $TbCu_7$ type with x=1.5. In an X-ray diffraction chart of the powder after solid solution treatment, no peak of α-(Fe,Co) is observed for all the compositions, but in an X-ray diffraction chart of the powder after atmospheric nitriding treatment, a peak of α-(Fe,Co) is observed, this peak becomes lower as x increases, and the peak of α-(Fe,Co) disappears at x=1.5. Based on this finding, the report concludes that V substitution is effective for suppressing precipitation of α-(Fe,Co). It is described that when the nitriding treatment temperature was 600° C. at x=1.5, the powder as milled had a coercivity Hcj of 256 kA/m (about 3.2 Oe), which coercivity is not sufficient as magnet material. The report does not teach the technical concept of causing a fine bcc structure T phase to precipitate for improving coercivity as in the present invention because the R content is equal to the stoichiometric composition and high coercivity is not attained although the $TbCu_7$ type phase is utilized.

JMEPEG (1993), 2, 219–224 reports utilization of a $TbCu_7$ type phase to attain a coercivity in excess of 22 kOe by using a liquid quenching technique. However, the alloy used in this report has the composition $Sm_{15}Fe_{85}$ which is samarium richer than the stoichiometric composition $Sm_2Fe_{17}$ and is free of an element M. That is, the report does not teach the technical concept of producing an inexpensive high-performance nitrided magnet by reducing the R content and adding an element M as in the present invention.

JP-A 172936/1994 discloses a magnetic material represented by the general formula: $R1_xR2_yA_zM_{100-x-y-x}$ wherein R1 is at least one element selected from the rare earth elements, R2 is at least one element selected from elements having an atomic radius of 0.156 to 0.174 nm, A is at least one element selected from H, C, N, and P, M is at least one element selected from Fe and Co, and x, y, and z indicative of at % are $x \geq 2$, $y \geq 0.01$, $4 \leq x+y \leq 20$, and $0 \leq z \leq 20$, wherein a primary phase has a crystal structure of $TbCu_7$ type and the element M in the primary phase occupies at least 90 at % based on the total amount of the elements in the primary phase excluding A. It is described that up to 20 at % of the entire amount of M may be replaced by T wherein T is at least one element selected from the group consisting of Si, Ti, Al, Ga, V, Ta, Mo, Nb, Cr, W, Mn, and Ni.

Although the magnetic material of the above-cited patent publication is analogous to the magnet of the present invention in that it has a primary phase of $TbCu_7$ type, the patent publication does not teach the technical concept that the primary phase coexists with a soft magnetic phase such as α-Fe phase, but merely describes that an increase of α-Fe phase entails a substantial decline of coercivity. Moreover, in the magnetic materials of the above-cited patent publication, the proportion of Fe+Co in the primary phase is as high as 90 at % or more, exceeding the preferred range of the present invention. Examples of the patent publication include nitrided magnets which are not based on Sm, but Nd or Pr as the rare earth element. These exemplary nitrided magnets have a lower nitrogen content than in the present invention. Bonded magnets are also prepared in Examples of the patent publication, but their magnetic properties are substantially surpassed by the bonded magnets prepared in Examples of the present invention.

JP-A 342706/1994 was laid open after the filing date of the application on which the present application is based. It discloses a magnetic material represented by the general formula: $R_xA_zCo_yFe_{100-x-y-z}$ wherein R is at least one element selected from the rare earth elements, A is at least one element selected from H, N, C, and P, and x, y, and z indicative of at % are $4\leqq x\leqq 20$, $0.01\leqq y\leqq 20$, and $z\leqq 20$, wherein a primary phase has a crystal structure of $TbCu_7$ type and Fe and Co in the primary phase occupy at least 90 at % based on the total amount of the elements in the primary phase excluding A. It is described that Fe may be partially replaced by an element M wherein M is at least one element selected from the group consisting of Ti, Cr, V, No, W, Mn, Ag, Cu, Zn, Nb, Ta, Ni, Sn, Ga, and Al.

Although the magnetic material of the above-cited patent publication is analogous to the magnet of the present invention in that it has a primary phase of $TbCu_7$ type, the patent publication does not teach the technical concept that the primary phase coexists with a soft magnetic phase such as α-Fe phase or describe the addition of Zr. Examples of the above-cited patent publication include nitrided magnets which have a lower nitrogen content than in the present invention. Moreover, in the magnetic materials of the patent publication, the proportion of Fe+Co in the primary phase is as high as 90 at % or more, exceeding the preferred range of the present invention. Bonded magnets are also prepared in Examples of the patent publication, but their magnetic properties are substantially surpassed by the bonded magnets prepared in Examples of the present invention.

JP-A 330252/1994 was laid open after the filing date of the application on which the present application is based. It discloses a powdery rare earth magnet material consisting of 2 to 7 at % of one or more rare earth metals (R) selected from Y and lanthanides, 1 to 15 at % of N and the balance of Fe, and having a metallic structure including at least two phases, a hard magnetic rare earth compound phase and a soft magnetic iron phase, each of the phases having a crystal grain size of up to 500 nm. It is described that part of Fe may be replaced by Zr and that the rare earth compound phase has a crystal structure of $Th_2Zn_{17}$, $ThMn_{12}$ or $TbCu_7$ type.

Although the magnet material of the above-cited patent publication is analogous to the magnet of the present invention in that it has a hard magnetic phase and a soft magnetic phase, the upper limit of the crystal grain size of the soft magnetic phase is 500 nm, which is greater than in the present invention. Throughout the patent publication, the size of the soft magnetic phase is specifically described only in Example 3. The magnet material of Example 3 includes a soft magnetic phase having a size of 10 to 50 nm which overlaps the range defined in the present invention. However, this magnet material has the composition: $Nd3.1Fe_{86.0}Ti_{7.8}N_{3.1}$ and is free of Sm and Zr, with the N content being below the range defined in the present invention. Moreover, this magnet material has a hard magnetic phase of $Th_1Mn_{12}$ which is completely different from the magnet of the present invention. The size of the soft magnetic phase is specifically described in none of the remaining Examples, and Zr is added in none of the Examples. In all the Examples, the nitrogen content is 6 at % or less, which is below the range defined in the present invention. Although the patent publication describes that the magnet materials of these Examples exhibited very high magnetic properties, we found through experiments that these magnet materials did not exhibit high magnetic properties and especially lacked a squareness ratio.

JP-A 279915/1994 was laid open after the filing date of the application on which the present application is based. It discloses a rare earth magnet material represented by the composition: $R_xFe_{100-x-y-z}$ wherein R is at least one rare earth element selected from Y and lanthanides, M is at least one element selected from V, Ti, and Mo, A is at least one element selected from N and C, and x, y, and z indicative of atom percents are in the range: $5\leqq x\leqq 15$, $1\leqq y\leqq 20$, and $1\leqq z\leqq 25$, and having a mean powder particle size of 10 to 200 μm. The patent publication describes nowhere the addition of Zr to magnet materials and a soft magnetic phase. With respect to crystal grain size, it is merely described that a quenched ribbon contains crystal grains of about 50 to 100 nm.

JP-A 66021/1995 was laid open after the filing date of the application on which the present application is based. It discloses a permanent magnet represented by the general formula: $R1_xR2_yA_zCo_uFe_{100-x-y-z-u}$ wherein R1 is at least one element selected from the rare earth elements, R2 is at least one element selected from elements having an atomic radius of 0.156 to 0.174 nm, A is at least one element selected from C, N, and P, and x, y, z, and u indicative of at % are $2\leqq x$, $0\leqq y$, $4\leqq x+y\leqq 20$, $0\leqq z\leqq 20$, and $0.01\leqq y+u$ and including a primary phase having a crystal structure of $TbCu_7$ type and an α-Fe or (FeCo) phase having an X-ray primary diffraction peak intensity which is 0.01 to 5 times that of the primary phase. Exemplary of R2 is at least one element selected from the group consisting of Sc, Zr, and Hf.

Although the magnet of the above-cited patent publication is analogous to the magnet of the present invention in that it has a primary phase of $TbCu_7$ type and an α-Fe phase and magnetic properties are improved by exchange interaction of both the phases. However, the patent publication describes nowhere a proportion of α-Fe phase. The volume ratio of α-Fe phase in the permanent magnet of the patent publication is unknown since the ratio in X-ray primary diffraction peak intensity of the α-Fe phase to the primary phase is not completely correlated to the volume ratio of these phases, but varies with the crystal grain size and crystallinity of the α-Fe phase, for example. The bonded magnets utilizing rapid quenching with a copper roll (peripheral speed 40 m/s) (Table 3) and the bonded magnets utilizing mechanical alloying (Table 4) as prepared in Examples of the patent publication have Zr and N contents which are below the range defined in the present invention and are thus deemed to have a lower squareness ratio Hk/iHc as defined previously and hence, a lower maximum energy product. In fact, Tables 3 and 4 show a substantially low maximum energy product and low remanence as compared with the Examples of the present invention.

JP-A 118815/1995 was laid open after the filing date of the application on which the present application is based. It discloses a permanent magnet comprising a magnetic alloy represented by the general formula: $R1_xR2_yA_zCo_uFe_{100-x-y-z-u}$ wherein R1 is at least one element selected from the rare earth elements, R2 is at least one element selected from Zr, Hf, and Sc, A is at least one element selected from C, N, and P, and x, y, z, and u indicative of at % are $2\leqq x$, $4\leqq x$ $+y \leqq 20$, $0 \leqq z \leqq 20$, and $0 \leqq u \leqq 70$ and including a primary phase having a crystal structure of $TbCu_7$ type wherein in an X-ray diffraction pattern using CuK α-ray (angular resolution up to 0.02°), the $TbCu_7$ type phase has a main reflection intensity $I_P$ and the α-Fe phase has a main reflection intensity $I_{Fe}$ wherein the half-value width of the main reflection intensity of the $TbCu_7$ type phase is up to 0.8° and $I_{Fe}/(I_{Fe}+I_P)$ is up to 0.4.

Although the permanent magnet of the above-cited patent publication is analogous to the magnet of the present invention in that it has a primary phase of $TbCu_7$ type and an α-Fe phase. However, the patent publication describes nowhere a proportion of α-Fe phase. As mentioned above, the volume ratio of both the phases cannot be determined from the ratio of main reflection intensity $I_{Fe}/(I_{Fe}+I_P)$ in X-ray diffraction. Exemplary magnets of the patent publication have a N content which is below the range defined in the present invention and are thus deemed to have a lower squareness ratio Hk/iHc as defined previously and hence, a lower maximum energy product. Also the bonded magnets utilizing rapid quenching with a copper roll (peripheral speed 40 m/s) as prepared in Examples of the patent publication have low remanence as compared with the Examples of the present invention.

ILLUSTRATIVE CONSTRUCTION

Magnet Textural Structure

Figure 1:
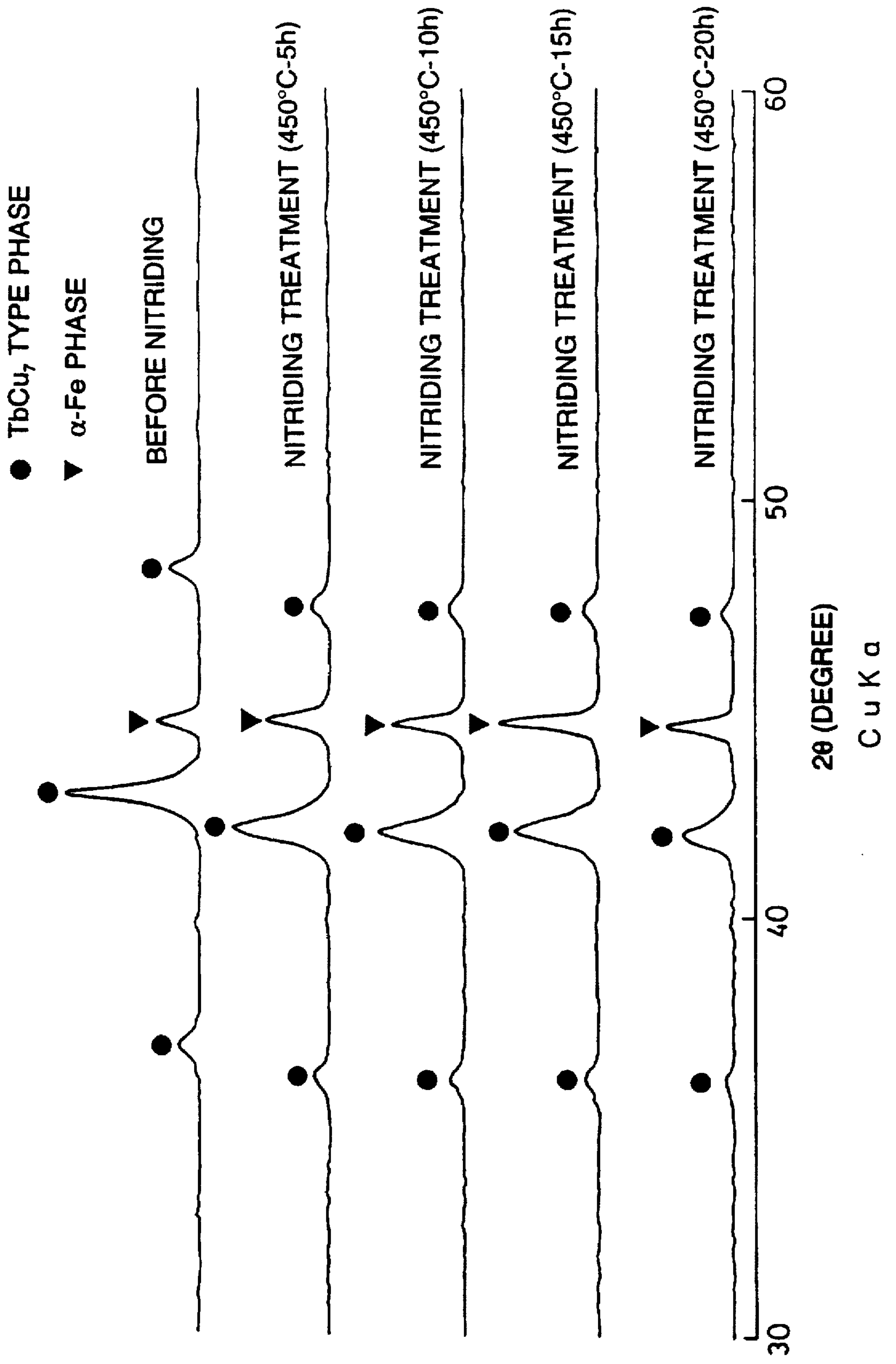
FIG. 1 illustrates an X-ray diffraction chart of a quenched alloy which has been heat treated for controlling its textural structure and X-ray diffraction charts of quenched alloys which have been nitrided.

The magnet of the present invention contains R, T, N, and M and has a composite structure containing a hard magnetic phase as a primary phase and a fine soft magnetic phase.

The hard magnetic phase is based on R, T, and N and has at least one crystalline phase selected from the group consisting of hexagonal $TbCu_7$ type, rhombohedral $Th_2Zn_{17}$ type, and hexagonal $Th_2Ni_{17}$ type, with nitrogen located at interstices in the crystal structure. The hard magnetic phase is usually a TbCu7 type crystalline phase, $Th_2Zn_{17}$ type crystalline phase, or a mixture of these two phases although a $Th_2Ni_{17}$ type crystalline phase can be present where a rare earth element heavier than Sm is contained. It is believed that R is mainly located at Th sites and Tb sites and T is mainly located at Zn sites, Ni sites and Cu sites although part of T can be located at Th sites and Tb sites. It is believed that M is mainly located at Zn sites, Ni sites and Cu sites depending on a particular element selected as M although M can also be located at Th sites and Tb sites. Also M can be located in the bcc structured T phase which is the soft magnetic phase.

In the hard magnetic phase, the atomic ratio T/(R+T+M) is preferably less than 90%, more preferably 75 to 87%. If T/(R+T+M) is too low, saturation magnetization and remanence would be low. If T/(R+T+M) is too high, maximum energy product would be low.

The soft magnetic phase consists of a T phase having a bcc structure, which is believed to be substantially an α-Fe phase or an α-Fe phase in which part of Fe is replaced by Co, M, R, etc.

The magnet of the present invention exhibits high coercivity when the soft magnetic phase has a mean crystal grain size of 5 to 60 nm. It is believed that high coercivity is developed because the magnet contains a hard magnetic phase having high crystal magnetic anisotropy and a soft magnetic phase having high saturation magnetization wherein the soft magnetic phase is microscopically fine so that the interface between both the phases is increased to induce exchange anisotropy. If the mean grain size of the soft magnetic phase is too small, saturation magnetization is low. If the same size is too large, coercivity and squareness ratio are low. It is noted that the magnet is more improved in performance when the soft magnetic phase preferably has a mean grain size of 5 to 40 nm and the hard magnetic phase has a crystal structure of $TbCu_7$ type.

The soft magnetic phase is generally irregular in configuration and can be confirmed using a transmission electron microscope. The mean grain size of the soft magnetic phase is calculated through image analysis of a magnet section. First, with respect to the soft magnetic phase contained in a region of the magnet section to be measured, the number of crystal grains n and the total of cross-sectional areas of crystal grains S are calculated by image analysis. Then the average cross-sectional area per crystal grain of the soft magnetic phase S/n is calculated. The diameter D of a circle having the area S/n is the mean grain size. That is, the mean grain size D is determined from the equation:

$$\pi(D/2)^2=S/n.$$

The region to be measured should preferably be delimited such that n may exceed 50.

Preferably the hard magnetic phase has a mean crystal grain size of 5 to 500 nm, more preferably 5 to 100 nm. If the mean grain size of the hard magnetic phase is too small, crystallinity would be insufficient and high coercivity be less available. If the mean grain size of the hard magnetic phase is too large, a longer time would be required for the nitriding treatment. The mean grain size of the hard magnetic phase is calculated by the same procedure as the mean grain size of the soft magnetic phase.

In the magnet, the soft magnetic phase occupies 10 to 60% by volume, preferably 10 to 36% by volume. If the proportion of the soft magnetic phase is too low or too high, no satisfactory magnet properties are available and especially maximum energy product is low. The proportion of the soft magnetic phase is determined by a so-called area analysis procedure using a transmission electron microscope photograph of a magnet section wherein a cross-sectional area ratio is a volume ratio.

Reason of Limitation of Magnet Composition

Described below is the reason of limitation of the magnet composition according to the invention.

The content of R is 4 to 8 at %, preferably 4 to 7 at %. The content of N is 10 to 20 at %, preferably 12 to 18 at %, more preferably from more than 15 at % to 18 at %, most preferably 15.5 to 18 at %. The content of M is 2 to 10 at %, preferably 2.5 to 5 at %. The remainder is essentially T.

If the R content is too low, coercivity is low. If the R content is too high, the amount of bcc structured T phase decreases to deteriorate magnet properties and use of a more amount of expensive R prohibits manufacture of an inexpensive magnet. In addition to samarium (Sm), the R which can be used herein is at least one element of Y, La, Ce, Pr, Nd, Eu, Gd, Tb, Dy, Ho, Er, Tm, Yb, and Lu. The hard magnetic phase in the magnet of the invention has a crystalline phase of $Th_2Zn_{17}$ type, $Th_2Ni_{17}$ type or $TbCu_7$ type, with nitrogen located at interstices in the crystal structure, and a hard magnetic phase of such construction exhibits maximum crystal magnetic anisotropy when R is Sm. Sm should be present in a proportion of at least 50 at %, preferably at least 70 at % of R because crystal magnetic anisotropy and coercivity become low if the proportion of Sm is lower.

If the N content is too low, there occur an insufficient increase of Curie temperature and insufficient improvements in coercivity, squareness ratio, saturation magnetization, and maximum energy product. If the N content is too high, remanence tends to lower and squareness ratio and maximum energy product become low. The N content may be measured by gas analysis or the like.

Element M is added for establishing the fine composite structure mentioned above. Absent element M, coarse crystal grains of soft magnetic phase precipitate during preparation of an alloy, failing to provide high coercivity even if the soft magnetic phase eventually has a relatively small mean grain size. If the M content is too low, it is difficult to produce a magnet in which the soft magnetic phase has a small mean grain size. If the M content is too high, saturation magnetization is low. M is Zr or Zr which is partially replaced by at least one element selected from the group consisting of Ti, V, Cr, Nb, Hf, Ta, Mo, W, Al, C, and P. The preferred element substituting for part of Zr is at least one of Al, C and P, with the Al being especially preferred. Zr is essential in the practice of the invention because it is especially effective for textural structure control and squareness ratio improvement. Also, since Al is effective for facilitating nitriding of a quenched alloy, the addition of Al can shorten the time required for nitriding treatment. Note that the Zr content of the magnet is preferably 2 to 4.5 at %, more preferably 3 to 4.5 at %. This stands both when only Zr is used as M and when Zr is used with another element(s) as M. If the Zr content is too low, both high coercivity and high squareness ratio are not available. If the Zr content is too high, saturation magnetization and remanence are low.

With the above-mentioned elements excluded from the magnet, the remainder is essentially T. T is Fe or a mixture of Fe and Co. Although addition of Co is effective for improving magnet properties, the proportion of Co in T is preferably up to 50 at %. If the proportion of Co exceeds 50 at %, remanence would be low.

X-ray Diffraction

In one embodiment where the hard magnetic phase contains a crystalline phase of $TbCu_7$ type, the magnet according to the invention on analysis by X-ray diffractometry using Cu-K α-ray preferably has an $I_S/I_H$ value of 0.4 to 2.0, more preferably 0.7 to 1.8 wherein $I_H$ is the intensity of a maximum peak of the $TbCu_7$ type crystalline phase and $I_S$ is the intensity of a maximum peak of the soft magnetic phase. The magnet exhibits a higher squareness ratio with $I_S/I_H$ in the range of 0.4 to 2.0, and a further higher squareness ratio with $I_S/I_H$ in the range of 0.7 to 1.8. With $I_S/I_H$ outside the range, the magnet tends to have a lower maximum energy product.

Where a quenched alloy is subject to heat treatment for textural structure control for causing a fine bcc structured T phase to precipitate during the preparation of magnet to be described later, the quenched alloy prior to the heat treatment should preferably have an $I_S/I_H$ value of up to 0.4, more preferably up to 0.25. By setting a low $I_S/I_H$ value immediately after quenching and increasing the $I_S/I_H$ value through heat treatment in this way, that is, by effecting heat treatment so as to promote precipitation of a bcc structured T phase, the fine bcc structured T phase can be effectively dispersed in the structure to readily establish excellent magnet properties.

In one preferred embodiment wherein Sm is present in a proportion of at least 80 at % of R, the $TbCu_7$ type crystalline phase exhibits a maximum peak in the range 2θ=42.00° to 42.50° on analysis by X-ray diffractometry using Cu-K α-ray. If the position of a maximum peak is displaced from this range, it would be difficult to achieve excellent properties. More particularly, if the position of a maximum peak is less than 2θ=42.00°, there would be a tendency that remanence lowers. If the position of a maximum peak is more than 2θ=42.50°, there would occur an insufficient increase of Curie temperature and insufficient improvements in coercivity, squareness ratio, saturation magnetization, and maximum energy product.

Preparation Process

Next is described a process suitable for the preparation of the magnet according to the present invention.

The process involves preparing a quenched alloy containing R, T, and M by a liquid quenching technique and subjecting the quenched alloy to nitriding treatment for converting into a magnet.

In the liquid quenching technique, an alloy melt containing R, T, and M is rapidly quenched to form a quenched alloy. The liquid quenching technique used herein is not critical and may be selected from various techniques such as single roll, dual roll, and atomizing techniques. Usually, the single roll technique is preferred because of high mass productivity and good reproducibility of quenching conditions. Where the single roll technique is employed, quenching conditions are not critical and may be properly set in accordance with a particular alloy composition so as to yield a desirable textural structure. A chill roll of copper or copper alloy is often used and preferably rotated at a peripheral speed of at least 10 m/s, more preferably at least 30 m/s, further preferably at least 45 m/s, especially at least 55 m/s, most preferably at least 65 m/s. An approximately adjusted value of roll peripheral speed allows the quenched alloy to take a nearly micro-crystalline or amorphous state so that any crystal grain size may be accomplished by subsequent heat treatment and nitriding be facilitated. This leads to a magnet having high coercivity, remanence, squareness ratio, and maximum energy product. Note that the preferred roll peripheral speed is usually up to 120 m/s. If the roll peripheral speed is too high, inefficient contact would occur between the molten alloy and the roll peripheral surface, failing to achieve effective heat transfer. This retards the effective cooling rate. By the single roll technique, a quenched alloy is usually available in the form of a thin ribbon. The ribbon preferably has a thickness of 8 to 200 μm, more preferably 10 to 60 μm although the thickness is not critical. It is difficult to produce a ribbon of less than 8 μm thick whereas a satisfactory cooling rate is difficultly achievable with a too thick ribbon.

The textural structure of quenched alloy is preferably a polycrystalline one which is substantially a single phase or fine composite structure or substantially an amorphous phase. Where the quenched alloy is polycrystalline, it contains one or more crystalline phases of $TbCu_7$, $Th_2Zn_{17}$, and $Th_2Ni_{17}$ types and often a T phase of bcc structure and optionally, an amorphous phase. If the proportion of a T phase of bcc structure is low or a T phase is substantially absent, the other crystalline phase is substantially of $TbCu_7$ type.

In order to provide a composite textural structure containing a bcc structured T phase with a predetermined mean grain size, the quenched alloy is usually subject to heat treatment for controlling its textural structure. The temperature of this heat treatment is preferably 400° to 800° C., more preferably 600° to 800° C., and the treating time is usually about 0.1 to 300 hours although it depends on the treating temperature. This heat treatment is preferably performed in a non-oxidizing atmosphere such as inert gas atmosphere, a reducing atmosphere or vacuum. The heat treatment induces precipitation of a fine bcc structured T phase and even precipitation of at least one crystalline phase of $TbCu_7$, $Th_2Zn_{17}$, and $Th_2Ni_{17}$ types.

It is also preferred that the heat treatment for textural structure control be performed in an atmosphere containing hydrogen gas. This heat treatment causes hydrogen to be occluded in the quenched alloy for thereby decomposing the crystal containing R, T, and M into a bcc structured T phase and an R hydride phase. In this embodiment, the treating temperature is preferably 350° to 950° C., more preferably 500° to 800° C. and the treating time is preferably 0.1 to 10 hours, more preferably 0.5 to 5 hours. Hydrogen gas in the atmosphere preferably has a pressure of 0.1 to 10 atm., especially 0.5 to 2 atm. The atmosphere used herein is not limited to hydrogen gas, and a mix atmosphere of hydrogen gas and an inert gas may be used. The inert gas used herein is, for example, He or Ar, or a mixture of these gases. By causing hydrogen to be occluded at 80° to 300° C., especially 200° to 250° C. for 0.1 to 1 hour, especially 0.25 to 0.5 hour before heating to the decomposition temperature, subsequent decomposition reaction will take place quickly and sufficiently.

After hydrogen occlusion, the quenched alloy is subject to heat treatment in a reduced pressure atmosphere for causing the alloy to release hydrogen. The hydrogen release results in a composite structure containing at least one crystalline phase of $Th_2Zn_{17}$ and $Th_2Ni_{17}$ types and a fine bcc structured T phase while a crystalline phase of $TbCu_7$ type is sometimes formed. In this heat treatment, the treating temperature is preferably 300° to 900° C., more preferably 450° to 850° C. and the treating time is preferably 0.05 to 5 hours, more preferably 0.25 to 3 hours. The pressure during the treatment is preferably up to $1\times10^{-2}$ Torr, more preferably up to $1\times10^{-3}$ Torr. The heat treatment for hydrogen release is performed after the heat treatment for hydrogen occlusion, preferably continuously without a temperature drop because higher productivity is expectable.

Such heat treatment utilizing hydrogen gas is especially effective for those quenched alloys having a low proportion of a bcc structured T phase or substantially free of a bcc structured T phase.

After the heat treatment for textural structure control, the quenched alloy is subject to nitriding treatment. For the nitriding treatment, the quenched alloy is heat treated in a nitrogen gas atmosphere. This treatment causes nitrogen atoms to enter crystals of $TbCu_7$, $Th_2Zn_{17}$ or $Th_2Ni_{17}$ type to form an interstitial solid solution, leading to a hard magnetic phase. During the nitriding treatment, the treating temperature is preferably 350° to 700° C., more preferably 350° to 600° C. and the treating time is preferably 0.1 to 300 hours. The pressure of nitrogen gas is at least about 0.1 atm. For the nitriding treatment, high pressure nitrogen gas, a mixture of nitrogen gas and hydrogen gas, or ammonia gas may also be used.

In general, the nitriding treatment is performed after the quenched alloy in ribbon, flake or granule form after pulverization. If even nitriding is possible, the quenched alloy may be subject to nitriding treatment without pulverization.

The shape of the magnet according to the invention is not critical and may be either a thin ribbon or a granular shape. When applied to magnet articles such as bonded magnets, the magnet is pulverized into magnet particles having a desired particle size.

For the bonded magnet application, the magnet particles preferably have a mean particle size of at least 10 μm. The mean particle size should preferably be at least 30 μm, more preferably at least 50 μm, most preferably at least 70 μm in order to provide satisfactory oxidation resistance. A particle size of this order ensures that a bonded magnet having a high density is obtained. No upper limit is imposed on the mean particle size although it is usually up to about 1,000 μm, preferably up to 250 μm. It is to be noted that the mean particle size used herein means a weight average particle size $D_{50}$ as determined by sieving. The weight average particle size $D_{50}$ is the particle size determined by accumulating the weight of particle fractions from one having a smaller diameter until the accumulated weight reaches 50% of the total weight of the entire particles.

A bonded magnet is prepared by binding magnet particles with a binder. The magnet of the present invention is applicable to either compression bonded magnets relying on press molding or injection bonded magnets relying on injection molding. The binder used herein is preferably selected from various resins while metal binders may be used to form metal bonded magnets. The type of resin binder is not critical and may be properly selected for a particular purpose from thermosetting resins such as epoxy resins and nylon and thermoplastic resins. Also the type of metal binder is not critical. Also, no limit is imposed on the proportion of the binder relative to the magnet particles and various molding conditions including pressure, which may be suitably selected from conventional ranges. Understandably, a method requiring high-temperature heat treatment should preferably be avoided in order to prevent enlargement of crystal grains.

EXAMPLE

Examples of the present invention are given below by way of illustration.

Example 1: Comparison in Terms of Additive Elements

Magnet powders as shown in Table 1 were prepared.

First, an alloy ingot was prepared by melting and crushed into pieces. The pieces were placed in a quartz nozzle where they were melted by RF induction heating into an alloy melt, which was quenched by a single roll technique, yielding a quenched alloy in ribbon form having a thickness of about 30 μm and a width of 5 mm. The chill roll used was a Be-Cu roll and rotated at a peripheral speed of 50 m/s. On analysis by X-ray diffractometry and a transmission electron microscope, the quenched alloy was found to have a polycrystalline composite structure containing a crystalline phase of $TbCu_7$ type and an α-Fe phase of bcc structure and further contain an amorphous phase.

Next, the quenched alloy was subject to heat treatment for textural structure control in an Ar gas atmosphere. The heat treatment was performed at 720° C. for 0.5 to 1.5 hours. On analysis by X-ray (Cu-K α-ray) diffractometry and a transmission electron microscope after the heat treatment, the alloy was found to be a polycrystalline composite structure containing a crystalline phase of $TbCu_7$ type and an α-Fe phase of bcc structure while the amorphous phase substantially disappeared. An X-ray diffraction chart of the quenched alloy of magnet powder No. 102 after the heat treatment is shown at the uppermost stage in FIG. 1.

Next, the crystallized alloy was pulverized to a size of less than about 150 μm and subject to nitriding treatment in a nitrogen gas atmosphere of 1 atm. at 450° C., yielding a magnet powder. For each magnet powder, the nitriding treatment time is reported in Table 1. An X-ray diffraction chart of magnet powder No. 102 after the nitriding treatment is shown in FIG. 1. For reference sake, X-ray diffraction charts of the same magnet powder after nitriding treatment for 10, 15 and 20 hours are also shown in FIG. 1.

It is seen from FIG. 1 that the crystalline structure is maintained after the nitriding treatment and the peak of the $TbCu_7$ type crystalline phase was shifted toward a low angle side by the nitriding treatment. It is thus understood that nitrogen atoms formed an interstitial solid solution with a crystal lattice, which was expanded.

Table 1 also reports the $I_S/I_H$ of each magnet powder immediately after quenching (prior to heat treatment) and the $I_S/I_H$ after the nitriding treatment. The position of a maximum peak of the $TbCu_7$ type crystalline phase after the nitriding treatment was examined. The magnet powder was rated "O" when the maximum peak fell within the range $2\theta$=42.00° to 42.50° and "X" when outside the range.

Figure 2:
FIG. 2 is a photograph as a substitute for drawing showing a grain size and their distribution, which is a transmission electron microscope photograph of a magnet powder.
Figure 3A:
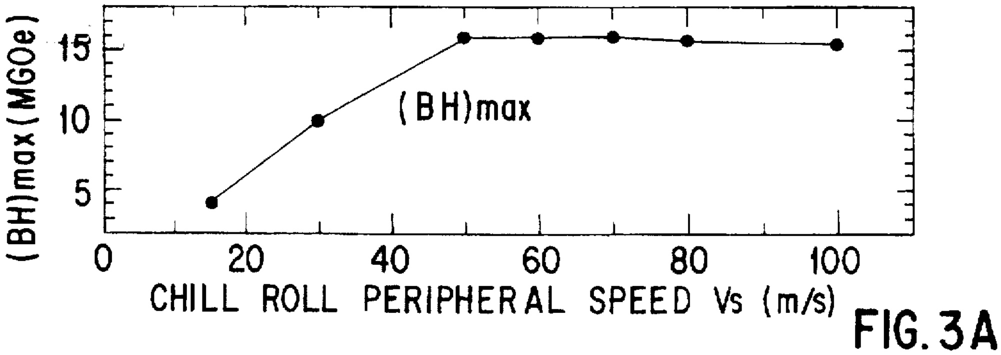
FIG. 3 is a graph showing magnet properties versus the peripheral speed of a chill roll.
Figure 3B:
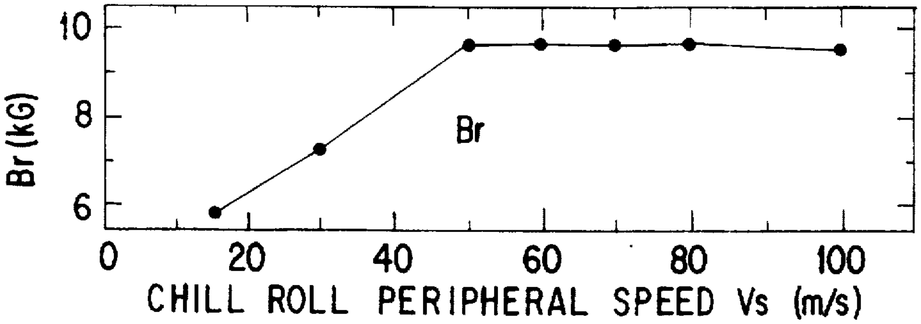
Figure 3C:
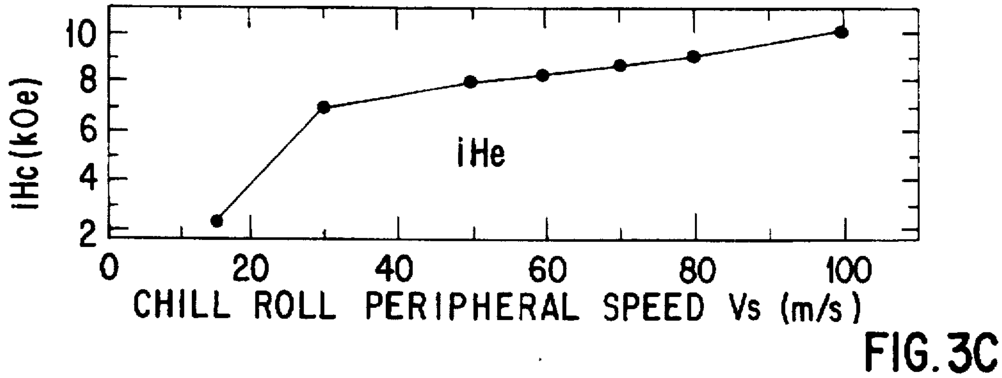
Figure 3D:
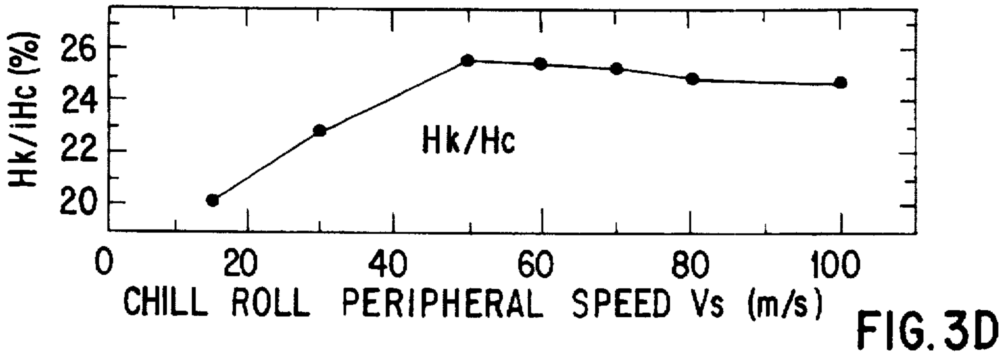

Using a transmission electron microscope, a structural observation was made on each magnet powder to determine the mean crystal grain size of α-Fe phase and the proportion of α-Fe phase in the magnet powder. The results are shown in Table 1. FIG. 2 is a photograph of magnet powder No. 102 under a transmission electron microscope wherein crystal grains with high density are of α-Fe phase.

The magnet powders were measured for remanence (Br), coercivity (iHc), squareness ratio (Hk/iHc), and maximum energy product ((BH)m). The results are shown in Table 1.

TABLE 1

Comparison in terms of additive elements

| Magnet powder No. | Composition (at %) Sm | Fe | Co | M | N | Crystalline phase | Nitriding treatment (hour) | α-Fe Mean grain size (nm) | α-Fe Proportion (vol %) |
|---|---|---|---|---|---|---|---|---|---|
| 101 | 5.9 | bal | — | 4.5Zr | 14.0 | $TbCu_7$ + α-Fe | 10 | 34 | 21.0 |
| 102 | 5.9 | bal | — | 3.5Zr - 4.0Al | 15.0 | $TbCu_7$ + α-Fe | 5 | 32 | 19.1 |
| 103 | 5.9 | bal | 10.0 | 3.5Zr - 4.0Al | 15.0 | $TbCu_7$ + α-Fe | 7 | 31 | 19.6 |
| 104 | 4.0 | bal | — | 3.5Zr - 4.0Al | 15.0 | $TbCu_7$ + α-Fe | 5 | 33 | 28.0 |
| 105 | 5.9 | bal | — | 3.5Zr - 1.5V | 13.0 | $TbCu_7$ + α-Fe | 10 | 32 | 20.1 |
| 106 | 5.9 | bal | — | 3.5Zr - 1.5Nb | 14.5 | $TbCu_7$ + α-Fe | 10 | 31 | 21.3 |
| 107* | 6.4 | bal | — | 4.5Nb* | 15.5 | $TbCu_7$ + α-Fe | 10 | 35 | 19.5 |
| 108* | 6.4 | bal | — | 3.5V* | 15.5 | $TbCu_7$ + α-Fe | 10 | 38 | 23.0 |
| 109* | 5.9 | bal | — | —* | 12.0 | $TbCu_7$ + α-Fe | 10 | 80* | 35.0 |
| 110 | 6.0 | bal | 5 | 3.5Zr | 15.1 | $TbCu_7$ + α-Fe | 10 | 27 | 13.0 |
| 111 | 6.0 | bal | 5 | 2.5Zr - 1Nb | 13.0 | $TbCu_7$ + α-Fe | 10 | 29 | 11.0 |
| 112* | 6.0 | bal | — | 3.5Ti* | 13.0 | $TbCu_7$ + α-Fe | 10 | 38 | 11.0 |
| 113* | 6.0 | bal | — | 3.5Mo* | 12.0 | $TbCu_7$ + α-Fe | 10 | 35 | 11.0 |
| 114* | 3.8* | bal | — | 5.7Zr | 5.7* | $TbCu_7$ + α-Fe | 10 | 35 | 25.0 |
| 115* | 3.8* | bal | — | 5.7V* | 5.7* | $TbCu_7$ + α-Fe | 10 | 37 | 28.0 |

| Magnet powder No. | Br (kG) | iHc (kOe) | Hk/iHc (%) | (BH)m (MGOe) | $I_S/I_H$ As quenched | $I_S/I_H$ As nitrided | Peak position |
|---|---|---|---|---|---|---|---|
| 101 | 8.7 | 5.3 | 31.0 | 13.1 | 0.01 | 1.78 | O |
| 102 | 8.6 | 8.0 | 20.0 | 13.0 | 0.03 | 0.43 | O |
| 103 | 8.7 | 7.7 | 25.0 | 13.5 | 0.03 | 0.55 | O |
| 104 | 8.6 | 5.1 | 29.5 | 13.2 | 0.28 | 0.85 | O |
| 105 | 8.4 | 5.8 | 27.0 | 12.8 | 0.04 | 0.72 | O |
| 106 | 8.5 | 6.0 | 28.0 | 13.1 | 0.02 | 0.75 | O |
| 107* | 7.8 | 7.4 | 13.5 | 7.5 | 0.08 | 1.65 | O |
| 108* | 7.5 | 7.1 | 13.5 | 6.8 | 0.12 | 2.05 | O |
| 109* | 3.4 | 0.9 | 14.2 | 1.2 | 4.50 | 4.56 | O |
| 110 | 9.7 | 8.1 | 25.7 | 16.1 | 0.02 | 0.65 | O |
| 111 | 9.4 | 8.3 | 23.1 | 14.1 | 0.03 | 0.45 | O |
| 112* | 8.3 | 4.1 | 14.6 | 6.0 | 0.50 | 0.38 | O |
| 113* | 8.1 | 4.0 | 12.5 | 5.8 | 0.45 | 0.36 | O |
| 114* | 8.0 | 3.1 | 10.8 | 4.7 | 1.10 | 1.25 | × |
| 115* | 7.5 | 2.9 | 9.8 | 3.9 | 3.50 | 1.40 | × |

*outside the scope of the invention

The effectiveness of the present invention is evident from the data shown in Table 1. More illustratively, magnet powders containing element M wherein α-Fe phase has a mean grain size within a specific range according to the present invention exhibit high coercivity despite a low R content. In contrast, magnet powder No. 109 free of M exhibits very low coercivity.

The effect of using Zr as essential additive element M is also evident from Table 1. More illustratively, where an element other than Zr is added alone, the squareness ratio is insufficient and the maximum energy product is very low. It is also seen that with N contents below the range of the present invention, the squareness ratio is low and the maximum energy product is very low. If the squareness ratio Hk/iHc is below 15% as in these samples, the magnet experiences a drastic change of magnetization with a slight change of an external demagnetizing field or self-demagnetizing field during use of the magnet, leading to unstable performance of a magnetic circuit including the magnet.

It is seen that although nitriding of a stoichiometric composition $Sm_2Fe_7$ requires about 60 hours, the compositional range according to the present invention allows the time required for nitriding to be reduced to about ⅓. It is also seen that addition of aluminum further reduces the nitriding time.

Note that magnet powder Nos. 101 to 108 had a relatively narrow distribution of grain size for α-Fe crystal grains. In contrast, magnet powder No. 109 had a wider distribution of grain size because many coarse α-Fe crystal grains were found therein. In each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 2: Comparison in Terms of R Content and Soft Magnetic Phase Proportion

Magnet powders of compositions as shown in Table 2 were prepared. The procedure was the same as the magnet powders of Example 1 except that the heat treatment for textural structure control was performed at 700° to 750° C. for 0.5 to 1 hour, the alloy after the heat treatment was pulverized to a size of less than about 80 μm, and the nitriding treatment was performed for the time shown in Table 2.

These magnet powders were measured as in Example 1. The results are shown in Table 2.

It is seen from Table 2 that very high remanence and maximum energy product are available as well as a high squareness ratio when the R content is 4 to 8 at % and the proportion of soft magnetic phase is more than 10% by volume.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 3: Comparison in Terms of Sm Proportion in R

Magnet powders of compositions as shown in Table 3 were prepared. The procedure was the same as the magnet powders of Example 2.

These magnet powders were measured as in Example 1. The results are shown in Table 3.

TABLE 2

Comparison in terms of R content and soft magnetic phase proportion

| Magnet powder No. | Composition (at %) Sm | Fe | Co | M | N | Crystalline phase | Nitriding treatment (hour) | α-Fe Mean grain size (nm) | α-Fe Proportion (vol %) |
|---|---|---|---|---|---|---|---|---|---|
| 201* | 2.5* | bal | — | 3.5Zr | 10.1 | $TbCu_7$ + α-Fe | 15 | 80* | 30.0 |
| 202 | 4.9 | bal | — | 3.5Zr | 13.0 | $TbCu_7$ + α-Fe | 10 | 28 | 20.5 |
| 203 | 5.8 | bal | — | 3.5Zr | 14.1 | $TbCu_7$ + α-Fe | 10 | 26 | 12.8 |
| 204 | 6.2 | bal | — | 3.5Zr | 13.3 | $TbCu_7$ + α-Fe | 10 | 28 | 12.2 |
| 205 | 7.3 | bal | — | 3.5Zr | 13.2 | $TbCu_7$ + α-Fe | 10 | 29 | 10.6 |
| 206* | 9.4* | bal | — | 3.5Zr | 13.3 | $TbCu_7$ + α-Fe | 10 | 30 | 5.0* |
| 207* | 10.0* | bal | — | 3.5Zr | 14.0 | $TbCu_7$ + α-Fe | 10 | —* | ~0* |
| 208* | 2.5* | bal | — | 1.5Zr* | 8.2* | $TbCu_7$ + α-Fe | 15 | 120* | 65.0* |

| No. | Br (kG) | iHc (kOe) | Hk/iHc (%) | (BH)m (MGOe) | $I_S/I_H$ As quenched | Peak position |
|---|---|---|---|---|---|---|
| 201* | 7.7 | 3.0 | 13.3 | 6.8 | 0.45 | × |
| 202 | 9.4 | 6.8 | 22.2 | 14.0 | 0.18 | ○ |
| 203 | 9.7 | 7.1 | 25.7 | 15.1 | 0.08 | ○ |
| 204 | 9.0 | 11.0 | 24.5 | 14.0 | 0.04 | ○ |
| 205 | 8.7 | 9.2 | 20.2 | 13.2 | 0.03 | ○ |
| 206* | 6.0 | 8.6 | 9.3 | 6.8 | 0.02 | ○ |
| 207* | 5.0 | 8.5 | 8.3 | 4.5 | 0.01 | ○ |
| 208* | 6.8 | 1.3 | 12.5 | 3.8 | 0.65 | × |

*outside the scope of the invention

TABLE 3

| Comparison in terms of Sm proportion in R | | | | | | | | | | |
|---|---|---|---|---|---|---|---|---|---|---|
| | | | | | | | | | α-Fe | |
| Magnet powder | Composition (at %) | | | | | | Crystal-line | Nitriding treatment | Mean grain size | Propor-tion |
| No. | Sm | Nd | Fe | Co | M | N | phase | (hour) | (nm) | (vol %) |
| 301 | 5.8 | — | bal | — | 3.5Zr | 14.0 | $TbCu_7$ + α-Fe | 12 | 24 | 11.0 |
| 302 | 4.5 | 1.3 | bal | — | 3.5Zr | 14.3 | $TbCu_7$ + α-Fe | 12 | 27 | 11.0 |
| 303* | 1.3 | 4.5* | bal | — | 3.5Zr | 14.3 | $TbCu_7$ + α-Fe | 12 | 28 | 11.0 |

| No. | Br (kG) | iHc (kOe) | Hk/iHc (%) | (BH)m (MGOe) | Peak position |
|---|---|---|---|---|---|
| 301 | 9.7 | 7.8 | 28.7 | 16.1 | ○ |
| 302 | 9.4 | 7.3 | 21.0 | 14.5 | ○ |
| 303* | 7.8 | 3.9 | 6.3 | 6.0 | × |

*outside the scope of the invention

It is seen from Table 3 that high properties are available when the proportion of Sm in R is more than 50 at %.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 4: Comparison in Terms of N Content

Magnet powders of compositions as shown in Table 4 were prepared. The procedure was the same as the magnet powders of Example 2 except that the nitriding treatment conditions were altered in the ranges of treating temperature 450° to 480° C. and treating time 1 to 20 hours.

These magnet powders were measured as in Example 1. The results are shown in Table 4.

TABLE 4

| Comparison in terms of N content | | | | | | | | |
|---|---|---|---|---|---|---|---|---|
| | | | | | | | α-Fe | |
| Magnet powder | Composition (at %) | | | | | Crystalline | Mean grain size | Propor-tion |
| No. | Sm | Fe | Co | M | N | phase | (nm) | (vol %) |
| 401* | 6.0 | bal | — | 3.5Zr | 9.0* | $TbCu_7$ + α-Fe | 29 | 11.0 |
| 402 | 6.0 | bal | — | 3.5Zr | 11.0 | $TbCu_7$ + α-Fe | 27 | 10.0 |
| 403 | 6.0 | bal | — | 3.5Zr | 13.0 | $TbCu_7$ + α-Fe | 28 | 11.0 |
| 404 | 6.0 | bal | — | 3.5Zr | 15.0 | $TbCu_7$ + α-Fe | 28 | 11.0 |
| 405 | 6.0 | bal | — | 3.5Zr | 15.5 | $TbCu_7$ + α-Fe | 24 | 11.0 |
| 406 | 6.0 | bal | — | 3.5Zr | 17.0 | $TbCu_7$ + α-Fe | 26 | 11.0 |
| 407* | 6.0 | bal | — | 3.5Zr | 23.0* | $TbCu_7$ + α-Fe | 30 | 13.0 |

| No. | Br (kG) | iHc (kOe) | Hk/iHc (%) | (BH)m (MGOe) | Peak position |
|---|---|---|---|---|---|
| 401* | 7.4 | 6.7 | 8.2 | 6.3 | × |
| 402 | 8.3 | 6.8 | 17.8 | 10.2 | ○ |
| 403 | 8.7 | 7.5 | 20.0 | 13.6 | ○ |

TABLE 4-continued

| Comparison in terms of N content | | | | | |
|---|---|---|---|---|---|
| 404 | 9.5 | 7.7 | 21.0 | 14.2 | ○ |
| 405 | 9.7 | 7.5 | 25.7 | 16.1 | ○ |
| 406 | 9.8 | 7.1 | 24.3 | 15.0 | ○ |
| 407* | 8.4 | 6.5 | 10.8 | 9.2 | × |

*outside the scope of the invention

It is seen from Table 4 that high properties, especially a high squareness ratio and maximum energy product are available when the N content is 10 to 20 at %, especially 12 to 18 at %, further especially from more than 15 at % to 18 at %.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 5: Comparison in Terms of Co Content

Magnet powders of compositions as shown in Table 5 were prepared. The procedure was the same as the magnet powders of Example 2.

These magnet powders were measured as in Example 1. The results are shown in Table 5.

TABLE 5

| Comparison in terms of Co content | | | | | | | | | | |
|---|---|---|---|---|---|---|---|---|---|---|
| | | | | | | | | | α-Fe | |
| Magnet powder | Composition (at %) | | | | | Crystal-line | Nitriding treatment | Mean grain size | Propor-tion |
| No. | Sm | Fe | Co | M | N | phase | (hour) | (nm) | (vol %) |
| 501 | 6.3 | bal | — | 3.3Zr | 15.1 | $TbCu_7$ + α-Fe | 15 | 26 | 12.0 |
| 502 | 6.3 | bal | 5 | 3.3Zr | 14.3 | $TbCu_7$ + α-Fe | 15 | 24 | 12.0 |
| 503 | 6.3 | bal | 10 | 3.3Zr | 14.3 | $TbCu_7$ + α-Fe | 15 | 25 | 12.0 |

| No. | Br (kG) | iHc (kOe) | Hk/iHc (%) | (BH)m (MGOe) | Peak position |
|---|---|---|---|---|---|
| 501 | 9.1 | 8.2 | 19.7 | 15.1 | ○ |
| 502 | 9.6 | 9.1 | 28.6 | 16.5 | ○ |
| 503 | 9.3 | 9.3 | 26.3 | 16.0 | ○ |

It is seen from Table 5 that high properties are available by adding a proper amount of Co.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 6: Comparison in Terms of Mean Grain Size of Soft Magnetic Phase

Magnet powders of compositions as shown in Table 6 were prepared. The procedure was the same as the magnet powders of Example 2 except hat the peripheral speed of the chill roll was altered in the range of 5 to 80 m/s and the structure controlling heat treatment conditions were altered in the ranges of treating temperature 700° to 750° C. and treating time 0.5 to 5 hours.

These magnet powders were measured as in Example 1. The results are shown in Table 6.

It is seen from Table 6 that high properties are available when the soft magnetic phase has a mean grain size of 5 to 60 nm, especially 5 to 40 nm.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 7: Comparison in Terms of Preparation Process

Magnet powder No. 701 shown in Table 7 was prepared by the same procedure as in Example 1. For comparison purposes, magnet powder No. 702 was prepared by the same procedure as magnet powder No. 701 except that a melt casting technique was used instead of the liquid quenching technique and the cast alloy was subject to solid solution treatment at 1,100° C. for 16 hours. These magnet powders were observed and measured as in Example 1. The results are shown in Table 7.

TABLE 6

| Comparison in terms of mean grain size of soft magnetic phase | | | | | | | | | | |
|---|---|---|---|---|---|---|---|---|---|---|
| | | | | | | | | | α-Fe | |
| Magnet powder | Composition (at %) | | | | | Crystal-line | Nitriding treatment | Mean grain size | Propor-tion |
| No. | Sm | Fe | Co | M | N | phase | (hour) | (nm) | (vol %) |
| 601 | 6.3 | bal | — | 3.4Zr | 13.5 | $TbCu_7$ + α-Fe | 10 | 20 | 13.0 |
| 602 | 6.3 | bal | — | 3.4Zr | 13.3 | $TbCu_7$ + α-Fe | 10 | 31 | 14.0 |
| 603* | 6.3 | bal | — | 3.4Zr | 13.3 | $TbCu_7$ + α-Fe | 10 | 105* | 16.0 |
| 604 | 6.2 | bal | 5 | 3.4Zr | 13.1 | $TbCu_7$ + α-Fe | 15 | 21 | 13.5 |
| 605 | 6.3 | bal | — | 3.4Zr | 13.3 | $TbCu_7$ + α-Fe | 10 | 45 | 14.0 |

| No. | Br (kG) | iHc (kOe) | Hk/iHc (%) | (BH)m (MGOe) | Peak position |
|---|---|---|---|---|---|
| 601 | 10.2 | 8.2 | 29.7 | 18.0 | ○ |
| 602 | 9.1 | 9.1 | 20.6 | 15.5 | ○ |
| 603* | 7.0 | 6.3 | 6.2 | 6.0 | ○ |
| 604 | 10.4 | 9.2 | 28.6 | 18.5 | ○ |
| 605 | 8.3 | 8.5 | 16.0 | 13.5 | ○ |

*outside the scope of the invention

TABLE 7

Comparison in terms of preparation process

| Magnet powder No. | Sm | Fe | Co | M | N | Crystalline phase | Nitriding treatment (hour) | α-Fe Mean grain size (nm) | α-Fe Proportion (vol %) |
|---|---|---|---|---|---|---|---|---|---|
| 701 | 5.9 | bal | — | 4.0Zr + 4.0Al | 15.0 | $TbCu_7$ + α-Fe | 7 | 28 | 28.0 |
| 702* | 5.9 | bal | — | 4.0Zr + 4.0Al | 15.0 | $Th_2Zn_{17}$ + α-Fe | 7 | 7000* | 31.0 |

| No. | Br (kG) | iHc (kOe) | Hk/iHc (%) | (BH)m (MGOe) | Peak position | Remarks |
|---|---|---|---|---|---|---|
| 701 | 8.0 | 8.3 | 19.0 | 13.1 | ○ | liquid quenching |
| 702* | 5.1 | 1.5 | 10.2 | 3.3 | $TbCu_7$ nil | melt casting |

*outside the scope of the invention

It is seen from Table 7 that when a melt casting technique is used, coarse α-Fe crystal grains precipitate to preclude high coercivity.

Note that in magnet powder No. 701, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 8: Comparison in Terms of Preparation Process and Crystal Form

Magnet powders as shown in Table 8 were prepared. First a quenched alloy was prepared as in Example 1 except that the chill roll was rotated at a peripheral speed of 40 m/s. The quenched alloy had a crystalline phase of $TbCu_7$ type and was substantially free of α-Fe phase. The quenched alloy was heat treated in a hydrogen gas atmosphere of 1 atm. at 700° C. for one hour and thereafter heated in vacuum at 700° C. for one hour for dehydrogenation. On X-ray diffractometry analysis after dehydrogenation treatment, formation of a crystalline phase of mainly $Th_2Zn_{17}$ type and and α-Fe phase was found. After the dehydrogenation treatment, the alloy was pulverized and nitrided as in Example 1, yielding a magnet powder. These magnet powders were observed and measured as in Example 1. The results are shown in Table 8.

It is seen from Table 8 that magnet powders having high coercivity are obtained by heat treatment in hydrogen for causing α-Fe phase to precipitate.

Note that in these magnet powders, the primary phase or $Th_2Zn_{17}$ type crystalline phase had a mean grain size of about 10 to 100 nm. On transmission electron microscope observation, the T concentration in the primary phase, T/(R+T+M), was found to fall in the range of 80 to 85%.

Example 9: Combination of Additive Elements

Magnet powders of compositions as shown in Table 9 were prepared. The procedure was the same as the magnet powders of Example 2.

These magnet powders were measured as in Example 1. The results are shown in Table 9.

TABLE 8

Comparison in terms of preparation process and crystal form

| Magnet powder No. | Sm | Fe | Co | M | N | Crystalline phase | Nitriding treatment (hour) | α-Fe Mean grain size (nm) | α-Fe Proportion (vol %) |
|---|---|---|---|---|---|---|---|---|---|
| 801 | 6.3 | bal | — | 3.0Zr | 10.0 | $Th_2Zn_{17}$ + α-Fe | 10 | 11 | 36.0 |
| 802 | 5.9 | bal | 5.0 | 3.5Zr − 1.5Al | 13.0 | $Th_2Zn_{17}$ + α-Fe | 10 | 12 | 34.0 |

| No. | Br (kG) | iHc (kOe) | Hk/iHc (%) | (BH)m (MGOe) | Peak position | Remarks |
|---|---|---|---|---|---|---|
| 801 | 8.1 | 5.3 | 19.0 | 12.5 | $TbCu_7$ nil | heat treatment in hydrogen |
| 802 | 8.2 | 6.0 | 20.1 | 12.7 | $TbCu_7$ nil | heat treatment in hydrogen |

TABLE 9

| Combination of additive elements | | | | | | | | | |
|---|---|---|---|---|---|---|---|---|---|
| Magnet powder | Composition (at %) | | | | | Crystalline | Nitriding treatment | α-Fe Mean grain size | α-Fe Proportion |
| No. | Sm | Fe | Co | M | N | phase | (hour) | (nm) | (vol %) |
| 901 | 6.1 | bal | 5 | 3.0Zr + 0.5Ti | 13.5 | $TbCu_7$ + α-Fe | 10 | 29 | 11.9 |
| 902 | 6.1 | bal | 5 | 3.0Zr + 0.5Cr | 14.1 | $TbCu_7$ + α-Fe | 10 | 31 | 10.8 |
| 903 | 6.1 | bal | 5 | 3.0Zr + 0.5Hf | 13.7 | $TbCu_7$ + α-Fe | 10 | 29 | 11.7 |
| 904 | 6.1 | bal | 5 | 3.0Zr + 0.5Ta | 14.3 | $TbCu_7$ + α-Fe | 10 | 32 | 12.3 |
| 805 | 6.1 | bal | 5 | 3.0Zr + 0.5Mo | 14.0 | $TbCu_7$ + α-Fe | 10 | 30 | 12.0 |
| 906 | 6.1 | bal | 5 | 3.0Zr + 0.5W | 15.1 | $TbCu_7$ + α-Fe | 10 | 31 | 11.5 |
| 907 | 6.1 | bal | 5 | 3.0Zr + 0.5C | 14.2 | $TbCu_7$ + α-Fe | 10 | 34 | 20.1 |
| 908 | 6.1 | bal | 5 | 3.0Zr + 0.5P | 13.7 | $TbCu_7$ + α-Fe | 10 | 35 | 14.3 |

| No. | Br (kG) | iHc (kOe) | Hk/iHc (%) | (BH)m (MGOe) | Peak position |
|---|---|---|---|---|---|
| 901 | 8.5 | 7.5 | 21.0 | 12.5 | ○ |
| 902 | 8.5 | 7.4 | 21.0 | 12.4 | ○ |
| 903 | 9.0 | 7.8 | 22.5 | 13.1 | ○ |
| 904 | 8.8 | 7.7 | 22.1 | 13.0 | ○ |
| 905 | 8.6 | 7.6 | 20.1 | 12.7 | ○ |
| 906 | 8.5 | 7.6 | 21.2 | 12.4 | ○ |
| 907 | 8.7 | 7.2 | 21.3 | 12.9 | ○ |
| 908 | 8.6 | 7.4 | 21.1 | 12.7 | ○ |

It is seen from Table 9 that high properties are available even when Zr is used in combination with other elements.

Note that in each of these magnet powders, the primary phase or $TbCu_7$ type crystalline phase had a mean grain size of about 10 to 100 nm. On transmission electron microscope observation, the T concentration in the primary phase, T/(R+T+M), was found to fall in the range of 80 to 85%.

Example 10: Bonded Magnets

A magnet powder of the composition shown in Table 10 was selected from the magnetic powders prepared in the foregoing Examples. Separately, a magnet powder having a relatively small mean particle size was prepared. Each magnet powder was mixed with an epoxy resin, press molded, and heat treated for curing into a compression bonded magnet. The epoxy resin was used in an amount of 2 to 3 parts by weight per 100 parts by weight of the magnet powder. During the press molding, the pressure holding time was 10 seconds and the applied pressure was 10,000 kgf/$cm^2$. The heat treatment for resin curing was at 150° C. for one hour. These bonded magnets were measured for magnetic properties as in Example 1. The results are shown in Table 10.

TABLE 10

| Bonded magnet | | | | | | | | | | | |
|---|---|---|---|---|---|---|---|---|---|---|---|
| Bonded magnet | Magnet powder | Composition (at %) | | | | | Magnet powder mean grain | Br | iHc | Hk/iHc | (BH)m |
| No. | No | Sm | Fe | Co | M | N | size (μm) | (kG) | (kOe) | (%) | (MGOe) |
| 1 | 110 | 6.0 | bal | 5 | 3.5Zr | 15.1 | 80 | 8.2 | 8.1 | 29.2 | 13.5 |
| 2 | 203 | 5.8 | bal | — | 3.5Zr | 14.1 | 80 | 8.0 | 7.3 | 28.7 | 11.6 |
| 3 | 301 | 5.8 | bal | — | 3.5Zr | 14.0 | 80 | 8.0 | 8.0 | 28.7 | 11.8 |
| 4 | 405 | 6.0 | bal | — | 3.5Zr | 15.5 | 80 | 8.1 | 7.5 | 27.3 | 12.0 |
| 5 | 502 | 6.3 | bal | 5 | 3.3Zr | 14.3 | 80 | 7.9 | 9.3 | 31.6 | 11.5 |
| 6 | 601 | 6.3 | bal | — | 3.4Zr | 13.5 | 80 | 8.6 | 8.4 | 32.7 | 12.6 |
| 7 | 604 | 6.2 | bal | 5 | 3.4Zr | 13.1 | 80 | 8.8 | 9.4 | 30.6 | 13.3 |
| 8 | — | 5.8 | bal | — | 3.5Zr | 14.3 | 40 | 7.9 | 7.3 | 28.7 | 11.4 |

The bonded magnets shown in Table 10 are isotropic and exhibit a very high maximum energy product of 11 to 13 MGOe or more. When the magnet powder has a mean particle size as small as about 40 μm, the Nd-Fe-B bonded magnet fails to provide satisfactory magnet properties. Nevertheless, the present invention provides high performance bonded magnets even when magnet powder having a small particle size is used. The magnet powder according to the present invention is especially suitable for the preparation of thin thickness magnets.

It is noted that bonded magnets prepared using magnet powders other than the composition shown in Table 10 also exhibited magnetic properties corresponding to the magnetic properties of a magnetic powder used.

Example 11: Comparison in Terms of Chill Roll Peripheral Speed

Magnetic powders were prepared while changing the peripheral speed of the chill roll and then examined for magnetic properties. For the heat treatment after quenching, optimum conditions were selected from the range: 600° to 750° C. and 1 to 2 hours in accordance with a particular cooling rate. The nitriding treatment was at 450° C. for 10 hours. The remaining conditions including a composition were the same as magnet powder No. 110. The results are shown in FIG. 3.

It is seen from FIG. 3 that very good magnetic properties are available when the peripheral speed of the chill roll is 45 m/s or more. The higher the peripheral speed, the higher becomes the coercivity.

The benefits of the present invention are evident from the foregoing Examples.

We claim:

1. A magnet consisting essentially of 4 to 8 at % of R, 10 to 20 at % of nitrogen, 2 to 20 at % of M, and the balance of T wherein R is at least one rare earth element, Sm being present in R in a proportion of at least 50 at %, T is Fe or Fe and Co, M is Zr with or without partial replacement by at least one element selected from the group consisting of Ti, V, Cr, Nb, Hf, Ta, Mo, W, Al, C, and P, said magnet comprising a hard magnetic phase based on R, T and nitrogen and containing at least one crystalline phase selected from the group consisting of $TbCu_7$ structure, $Th_2Zn17$ structure, and $Th_2Ni_{17}$ structure and a soft magnetic phase consisting of a T phase having a bcc structure, said soft magnetic phase having a mean grain size of 5 to 60 nm and being present in a proportion of 10 to 60% by volume.

2. The magnet of claim 1 having a squareness ratio Hk/iHc of at least 15%.

3. The magnet of claim 1 which is prepared by forming a quenched alloy by a liquid quenching technique and subjecting the quenched alloy to nitriding treatment.

4. The magnet of claim 3 wherein the liquid quenching technique includes setting the surface speed of a chill base relative to a molten alloy to at least 45 m/s.

5. The magnet of claim 3 which is prepared by heat treating the quenched alloy for controlling its textural structure prior to the nitriding treatment.

6. The magnet of claim 5 wherein said heat treatment includes the steps of subjecting the quenched alloy to heat treatment for controlling its textural structure in a hydrogen-containing atmosphere, and causing hydrogen to release from within the quenched alloy for precipitating at least one crystalline phase selected from the group consisting of $TbCu_7$, structure $Th_2Zn_{17}$ structure, and $Th_2Ni_{17}$ structure and a T phase of bcc structure.

7. The magnet of claim 6 wherein the quenched alloy has a crystalline phase of $TbCu_7$ structure prior to the heat treatment for controlling its textural structure.

8. The magnet of claim 5 wherein the quenched alloy prior to the heat treatment for controlling its textural structure, as analyzed by X-ray diffractometry, has an $I_S/I_H$ value of up to 0.4 wherein $I_H$ is the intensity of a maximum peak of the $TbCu_7$ structure crystalline phase and $I_S$ is the intensity of a maximum peak of the soft magnetic phase.

9. The magnet of claim 1 wherein Sm is present in R in a proportion of at least 80 at %, and the hard magnetic phase contains a crystalline phase of $TbCu_7$ structure which exhibits a maximum peak in the range $2\theta$=42.00° to 42.50° on analysis by X-ray diffractometry.

10. A bonded magnet comprising a powder of the magnet of claim 1 and a binder.

* * * * *

UNITED STATES PATENT AND TRADEMARK OFFICE

CERTIFICATE OF CORRECTION

PATENT NO. : 5,750,044

DATED : May 12, 1998

INVENTOR(S) : Yoneyama, et. al.

It is certified that error appears in the above-identified patent and that said Letters Patent is hereby corrected as shown below:

Column 25, line 31, "$Th_2Zn17$" (first occurance), should read --$Th_2Zn_{17}$--.

Signed and Sealed this

Twenty-second Day of September, 1998

Attest:

BRUCE LEHMAN

Attesting Officer

Commissioner of Patents and Trademarks